(12) United States Patent
Koshino

(10) Patent No.: US 12,550,035 B2
(45) Date of Patent: Feb. 10, 2026

(54) TRAIN CONTROL SYSTEM

(71) Applicant: Mitsubishi Electric Corporation, Tokyo (JP)

(72) Inventor: Daisuke Koshino, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 332 days.

(21) Appl. No.: 18/551,241

(22) PCT Filed: Mar. 31, 2021

(86) PCT No.: PCT/JP2021/013961
§ 371 (c)(1),
(2) Date: Sep. 19, 2023

(87) PCT Pub. No.: WO2022/208782
PCT Pub. Date: Oct. 6, 2022

(65) Prior Publication Data
US 2024/0172079 A1 May 23, 2024

(51) Int. Cl.
*H04W 36/32* (2009.01)
*B61L 27/10* (2022.01)
(Continued)

(52) U.S. Cl.
CPC ........... *H04W 36/324* (2023.05); *B61L 27/10* (2022.01); *H04W 36/08* (2013.01); *H04W 36/142* (2023.05)

(58) Field of Classification Search
CPC . H04W 36/324; H04W 36/08; H04W 36/142; H04W 36/0009; H04W 4/42;
(Continued)

(56) References Cited

U.S. PATENT DOCUMENTS

2012/0320875 A1* 12/2012 Ishihara .............. B61L 15/0027
370/331
2015/0078276 A1* 3/2015 Nagasaki .............. H04W 88/08
370/329
(Continued)

FOREIGN PATENT DOCUMENTS

| JP | 2000165312 A | 6/2000 |
| JP | 2011166361 A | 8/2011 |
| WO | 2014002753 A1 | 1/2014 |

OTHER PUBLICATIONS

International Search Report (PCT/ISA/210) with English translation and Written Opinion (PCT/ISA/237) mailed on Jun. 15, 2021, by the Japanese Patent Office as the International Searching Authority for International Application No. PCT/JP2021/013961.
(Continued)

*Primary Examiner* — Dhaval V Patel
(74) *Attorney, Agent, or Firm* — Buchanan Ingersoll & Rooney PC

(57) ABSTRACT

A train control system includes a ground control device installed on a first route; a wireless base station connected to the ground control device; a ground control device installed on a second route that is adjacent to the first route; and a wireless base station connected to the ground control device. The ground control device performs handover reservation between with all the wireless base stations installed between a first station installed on the first route and a second station that is installed on the second route and is adjacent to the first station, and the ground control device transmits, to the ground control device, a handover reservation request between with all the wireless base stations disposed between the first station and the second station. The ground control device transmits, to the ground control device, a result of the handover reservation request between with all the wireless base stations.

8 Claims, 3 Drawing Sheets

(51) Int. Cl.
*H04W 36/08* (2009.01)
*H04W 36/14* (2009.01)

(58) Field of Classification Search
CPC ...... B61L 27/10; B60L 2200/26; B60L 15/40; Y02T 90/16
See application file for complete search history.

(56) References Cited

U.S. PATENT DOCUMENTS

2015/0249948 A1* 9/2015 Yamamoto .......... H04W 36/324
455/441
2017/0311216 A1* 10/2017 Mythri Hunukumbure ................
H04L 67/12
2018/0001916 A1* 1/2018 Aoyama ................ B61L 27/70

OTHER PUBLICATIONS

Senda, "Digital Train Radio System for Hokuriku Shinkansen", New Communication Technology and Applications, Mitsubishi Denki Giho, vol. 89, No. 6, Jun. 16, 2015, pp. 1-13.

* cited by examiner

TRAIN CONTROL SYSTEM

FIELD

The present disclosure relates to a train control system using wireless communication.

BACKGROUND

In recent years, a train control system using wireless communication called communication based train control (CBTC) has been introduced. In the train control system using wireless communication, various types of information including location information and control information about a train are transmitted and received by wireless communication between a ground wireless base station installed along a railroad line and an on-board wireless station installed in a traveling train. In such a train control system, it is difficult for one ground wireless base station to cover the entire area along the railroad line, and multiple ground wireless base stations are required in the entire area along the railroad line. The ground wireless base stations are installed at intervals of several hundred meters, and the on-board wireless station requires handover for switching the ground wireless base station as a communication destination as a train moves.

Patent Literature 1 discloses a train control system in which an on-vehicle system of a train includes a plurality of on-vehicle wireless communication means corresponding to wireless communication using a plurality of kinds of frequencies used by a plurality of wireless base stations installed on the ground, thereby the train control system smoothly and reliably performs handover of a plurality of wireless base stations in a ground-side system.

CITATION LIST

Patent Literature

Patent Literature 1: Japanese Patent Application Laid-open No. 2011-166361

SUMMARY OF INVENTION

Problem to be Solved by the Invention

However, in a case where a train enters a route of another company, there is a case where the handover cannot be performed because the wireless communication system is different from that of a route of the own company. In such a case, there is a problem that the train cannot enter the route of another company.

The present disclosure has been made to solve the problem described above, and an object thereof is to provide a train control system that can reliably perform handover and smoothly enter a route of another company when a train enters the route of another company.

Means to Solve the Problem

In order to achieve the above object, in a train control system for a train that travels on a route including a first route managed by a first railway operator and a second route that is adjacent to the first route and is managed by a second railway operator, a train control system according to the present disclosure includes: a first ground control device installed on the first route; a first wireless base station installed on the first route and connected to the first ground control device, a second ground control device installed on the second route; and a second wireless base station installed on the second route and connected to the second ground control device, in which the first ground control device and the second ground control device can communicate with each other, the first ground control device performs handover reservation between with all the first wireless base stations disposed between a first station at which the train stops, the first station being installed on the first route, and a second station at which the train stops, the second station being installed on the second route and adjacent to the first station, and the first ground control device further transmits, to the second ground control device, a handover reservation request between with all the second wireless base stations disposed between the first station and the second station, and the second ground control device transmits, to the first ground control device, a result of the handover reservation request between with all the second wireless base stations disposed between the first station and the second station.

Effects of the Invention

In a train control system for a train that travels on a route including a first route managed by a first railway operator and a second route that is adjacent to the first route and is managed by a second railway operator, a train control system according to the present disclosure includes: a first ground control device installed on the first route; a first wireless base station installed on the first route and connected to the first ground control device; a second ground control device installed on the second route; and a second wireless base station installed on the second route and connected to the second ground control device, in which the first ground control device and the second ground control device can communicate with each other, the first ground control device performs handover reservation between with all the first wireless base stations disposed between a first station at which the train stops, the first station being installed on the first route, and a second station at which the train stops, the second station being installed on the second route and adjacent to the first station, and the first ground control device further transmits, to the second ground control device, a handover reservation request between with all the second wireless base stations disposed between the first station and the second station, and the second ground control device transmits, to the first ground control device, a result of the handover reservation request between with all the second wireless base stations disposed between the first station and the second station. As a result, when the train enters a route of another company, it is possible to reliably perform handover and smoothly enter the route of another company.

DESCRIPTION OF EMBODIMENTS

Figure 1:
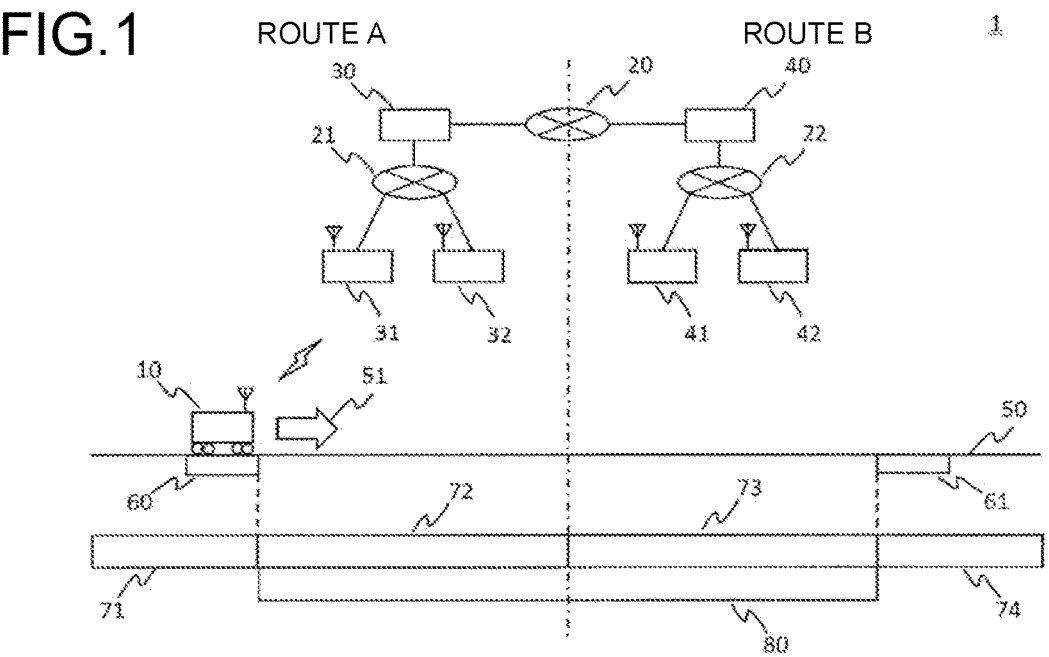
FIG. 1 is a diagram illustrating a schematic configuration of a train control system 1 according to an embodiment.

Hereinafter, an embodiment of a train control system according to the present disclosure will be described with reference to the drawings. Note that, in the drawings, identical or equivalent portions are denoted by the same reference numerals.

FIG. 1 is a configuration diagram of a train control system 1 according to an embodiment of the present disclosure. The train control system 1 illustrated in FIG. 1 includes a train 10, a station 60, a station 61, a ground control device 30, a ground control device 40, a wireless base station 31, a wireless base station 32, a wireless base station 41, and a wireless base station 42. The train 10 travels in a direction of an arrow 51 on a track 50.

In FIG. 1, in the train control system 1, a route on which the train 10 travels is sectioned into a route A and a route B. The route A and the route B are adjacent routes. In FIG. 1, areas separated by a one dotted chain line are individually illustrated as the route A and the route B. The track 50 is laid across the route A and the route B. The route A is a route managed by a first railway operator, and the route B is a route managed by a second railway operator.

On the route A, the station 60, the ground control device 30, the wireless base station 31, and the wireless base station 32 are installed. Further, on the route B, the station 61, the ground control device 40, the wireless base station 41, and the wireless base station 42 are installed. Here, the number of wireless base stations disposed in each of the route A and the route B is two, but the number of wireless base stations may be one or three or The train 10 includes an on-board control device (not illustrated) for controlling traveling and stopping. In order to control the train 10, the on-board control device communicates with the ground control device 30 and the ground control device 40 via an on-board wireless station (not illustrated) installed in the train 10.

The ground control device 30 can communicate with the wireless base station 31 and the wireless base station 32 via a ground network 21. The ground control device 30 transmits control information about the train 10 between with the wireless base station 31 and the wireless base station 32, and controls the wireless base stations at the time of handover for switching the wireless base station as a connection destination of the on-board wireless station of the train 10 when the train 10 moves on the track 50. For example, the on-board wireless station of the train 10 switches the connection destination of the wireless communication from the wireless base station 31 to the wireless base station 32 by performing the handover as the train 10 moves on the track 50 in a direction from the wireless base station 31 toward the wireless base station 32. In addition, the ground control device 30 receives train location information from the train 10 via the wireless base station 31 and the wireless base station 32, and grasps a location of the train 10 from the received train location information. On the basis of the location information acquired from the train 10, stop limit information about the train 10 is calculated, and the stop limit information is transmitted to the train 10 via the wireless base station 31 and the wireless base station 32.

The ground control device 40 can communicate with the wireless base station 41 and the wireless base station 42 via a ground network 22. The ground control device 40 transmits control information about the train 10 between with the wireless base station 41 and the wireless base station 42, and controls the wireless base stations at the time of handover for switching the wireless base station as a connection destination of the on-board wireless station of the train 10 when the train 10 moves on the track 50. For example, the on-board wireless station of the train 10 switches the connection destination of the wireless communication from the wireless base station 41 to the wireless base station 42 by performing the handover as the train 10 moves on the track 50 in a direction from the wireless base station 41 toward the wireless base station 42. In addition, the ground control device 40 receives train location information from the train 10 via the wireless base station 41 and the wireless base station 42, and grasps a location of the train 10 from the received train location information. On the basis of the location information acquired from the train 10, stop limit information about the train 10 is calculated, and the stop limit information is transmitted to the train 10 via the wireless base station 41 and the wireless base station 42.

The station 60 is disposed on the route A. The station 60 is a station closest to the route B among stop stations disposed on the route A in a traveling direction of the train 10. The station 61 is disposed on the route B. The station 61 is a station closest to the route A among stop stations disposed on the route B in the traveling direction of the train 10.

The wireless base station 31 and the wireless base station 32 can communicate with the ground control device 30 via the ground network 21. The wireless base station 31 and the wireless base station 32 are wireless base stations disposed on the route A. In a case where the train 10 standing at the station 60 travels in the direction of the arrow 51, the wireless base station 31 and the wireless base station 32 are disposed in this order from a side closer to the station 60.

The wireless base station 41 and the wireless base station 42 can communicate with the ground control device 40 via the ground network 22. The wireless base station 41 and the wireless base station 42 are wireless base stations disposed on the route B. In a case where the train 10 standing at the station 60 travels in the direction of the arrow 51, the wireless base station 41 and the wireless base station 42 are disposed in this order from a side closer to the station 60.

The wireless base station 31, the wireless base station 32, the wireless base station 41, and the wireless base station 42 are wireless base stations installed between the stations 60 and 61. In the traveling direction of the train 10, the wireless base station 31, the wireless base station 32, the wireless base station 41, and the wireless base station 42 are disposed in this order from a side closer to the station 60.

The ground control device 30 and the ground control device 40 can communicate with each other via a ground network 20. When the train 10 travels from the station 60 disposed on the route A toward the station 61 disposed on the route B, the ground control device 30 transmits, to the ground control device 40, a handover reservation request for establishing a state where the train 10 can communicate with the wireless base station 41 and the wireless base station 42. In addition, when the train 10 travels from the station 61 toward the station 60, the ground control device 40 transmits, to the ground control device 30, a handover reservation request for establishing a state where the train 10 can communicate with the wireless base station 32 and the wireless base station 31. Details will be described later.

Here, handover reservation will be described. The handover reservation is to enable the on-board wireless station to communicate with the wireless base station. The on-board wireless station communicates with the wireless base station by using a wireless resource allocated by the wireless base station. Examples of the wireless resource include a time slot, a frequency slot, and the like. When the wireless resource for communicating with the on-board wireless station is allocated in the wireless base station, the on-board wireless station and the wireless base station can communicate with each other. Whereas, when the wireless resource for communicating with the on-board wireless station is not allocated in the wireless base station, the on-board wireless station and the wireless base station cannot communicate with each other. The handover reservation request means that the on-board wireless station requests allocation of the wireless resource of the wireless base station as a handover destination, to enable communication with the wireless base station as the handover destination. The handover reservation request is performed by the on-board control device to the ground control device connected to the wireless base station as the handover destination, via the on-board wireless station, the wireless base station currently performing communication, and the ground control device connected to the wireless base station currently performing communication. The ground control device connected to the wireless base station as the handover destination determines propriety of allocation of the wireless resource of the wireless base station requested for the handover. Handover reservation establishment means a state where the wireless resource of the wireless base station as the handover destination can be allocated, and the on-board wireless station and the wireless base station as the handover destination can communicate with each other. A state where the handover reservation is not established means a state where the wireless resource of the wireless base station as the handover destination cannot be allocated, and thus the on-board wireless station and the wireless base station as the handover destination cannot communicate with each other. Examples of the case where the wireless resource cannot be allocated include a case where there is no free space in the wireless resource of the wireless base station, and a case where communication between the ground control device and the wireless base station cannot be properly performed due to a communication load situation.

Here, in order to simplify the description, in the traveling direction of the train 10, a path to the station 60 on the route A will be expressed as a "path 71", a path from the station 60 to a boundary between the route A and the route B will be expressed as a "path 72", a path from the boundary between the route A and the route B to the station 61 will be expressed as a "path 73", and a path from the station 61 on the route B will be expressed as a "path 74". Further, a path between the station 60 and the station 61 will be expressed as a "shared path 80". The shared path 80 is a path consisting of the path 72 and the path 73.

Figure 2:
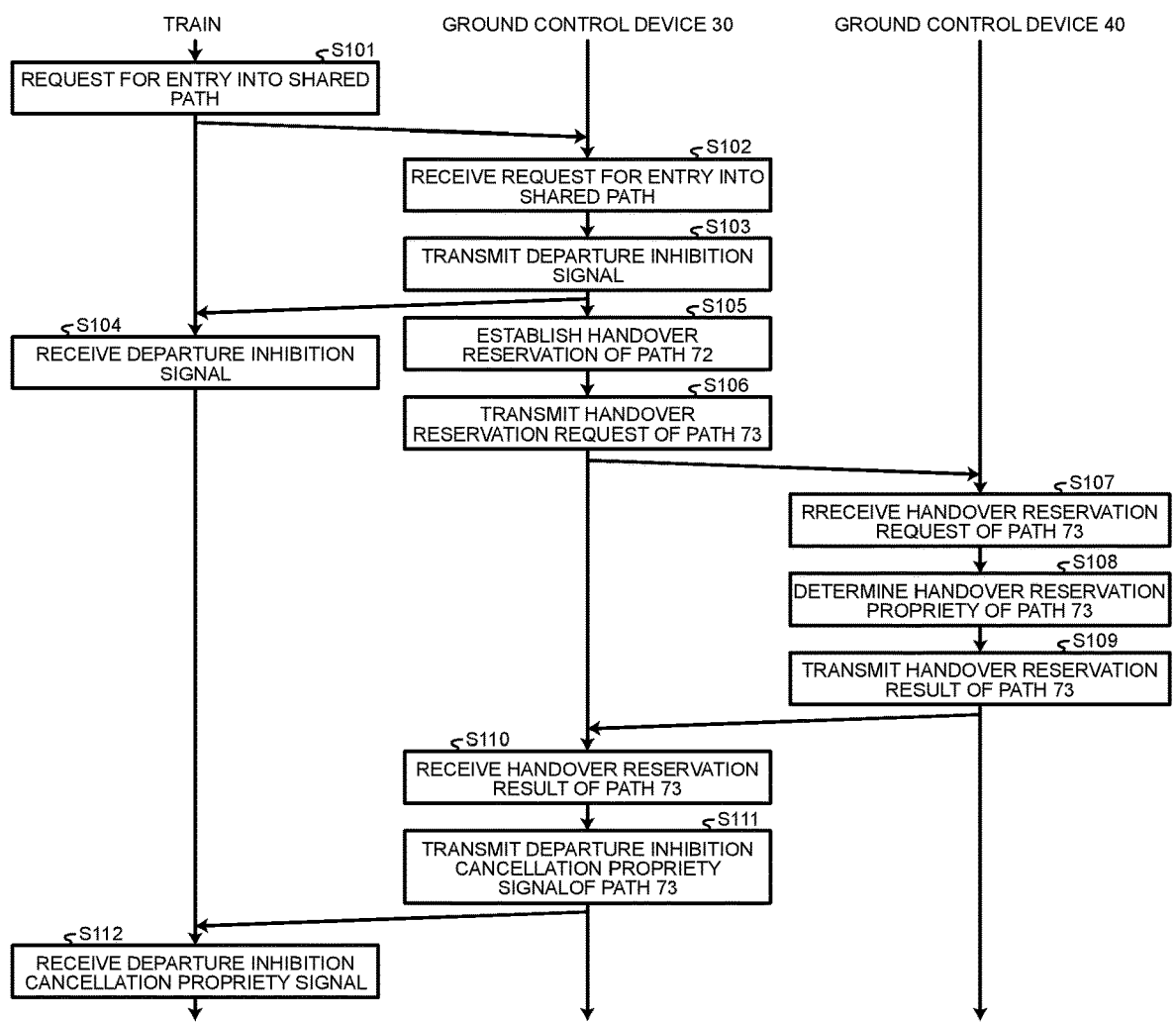
FIG. 2 is a sequence diagram illustrating an example of an operation of the train control system 1 according to the embodiment.

Next, an operation of the train control system 1 according to the embodiment of the present disclosure will be described. FIG. 2 is a sequence diagram illustrating an example of operations of the train 10, the ground control device 30, and the ground control device 40 when allocation reservation of a wireless resource associated with handover is performed.

First, the train 10 stops at the station 60, and the on-board control device requests the ground control device 30 for entry into the shared path 80 via the on-board wireless station (S101). The ground control device 30 receives, from the train 10, a request for entry into the shared path 80 (S102). The ground control device 30 transmits, to the train 10, a departure inhibition signal indicating that the train does not depart from the station 60 (S103). The train 10 receives the departure inhibition signal from the ground control device 30, and continues to stand at the station 60 (S104). After transmitting the departure inhibition signal to the train 10 in S103, the ground control device 30 creates a handover destination list of the route A in the shared path 80. Specifically, the ground control device 30 creates the list of handover destinations including all the wireless base stations disposed on the path 72 of the route A. Here, the ground control device 30 allocates a wireless resource of the wireless base station 31 and the wireless base station 32, establishes handover reservation, and creates a list of handover destinations including the wireless base station 31 and the wireless base station 32 (S105). Next, the ground control device 30 transmits a handover reservation request of the path 73 to the ground control device 40 (S106). The ground control device 40 receives the handover reservation request of the path 73 from the ground control device 30 (S107). The ground control device 40 determines wireless resource allocation propriety by setting all the wireless base stations disposed on the path 73 of the route B as the wireless base stations as the handover destination. (S108). The ground control device 40 transmits, to the ground control device 30, a result of the wireless resource allocation propriety of the path 73, that is, a handover reservation result that is a result for the handover reservation request from the ground control device 30 (S109). The ground control device 30 receives the handover reservation result of the path 73 from the ground control device 40 (S110). The ground control device 30 transmits, to the train 10, a signal indicating departure inhibition cancellation propriety indicating propriety of entry into the shared path 80 (S111). The train 10 receives a signal indicating the departure inhibition cancellation propriety from the ground control device 30 (S112).

Figure 3:
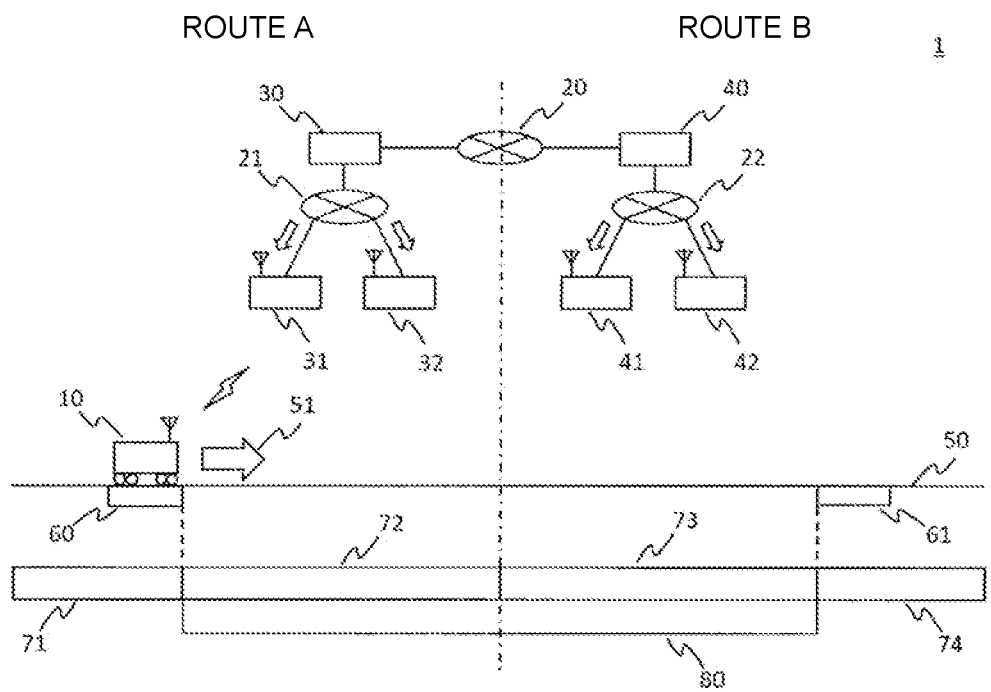
FIG. 3 is a diagram illustrating an example of handover reservation of the train control system 1 according to the embodiment.

Next, a case where the handover reservation of the shared path 80 is established will be described. FIG. 3 is a conceptual diagram illustrating that handover reservation of the shared path 80 is established. When the ground control device 30 receives the request for entry into the shared path 80 from the train 10 described in S102 of FIG. 2, as described in S105 of FIG. 2, the ground control device 30 determines whether it is possible to allocate the wireless resource of all the wireless base stations disposed on the route A in the shared path 80, specifically, the wireless base station 31 and the wireless base station 32. When the wireless resource of the wireless base station 41 and the wireless base station 42 can be secured, the ground control device 30 performs wireless resource allocation and establishes handover reservation. In other words, the ground control device 30 establishes handover reservation of all the wireless base stations disposed on the path 72 of the first railway operator in the shared path 80. Next, as described in S106 of FIG. 2, the ground control device 30 requests the ground control device 40 for handover reservation of all the wireless base stations disposed on the route B in the shared path 80, specifically, the wireless base station 41 and the wireless base station 42. In other words, the ground control device 30 requests handover reservation of all the wireless base stations disposed on the path 73 of the second railway operator, which is an entry destination of the train 10 in the shared path 80. The ground control device 40 determines whether it is possible to allocate a wireless resource of the wireless base station 41 and the wireless base station 42 disposed on the path 73. When the wireless resource of the wireless base station 41 and the wireless base station 42 can be secured, the ground control device 40 establishes handover reservation of the wireless base station 41 and the wireless base station 42, and transmits, to the ground control device 30, a handover reservation result indicating that the handover reservation is established, as a response to the handover reservation request. As described in S110 of FIG. 2, when receiving the handover reservation result indicating the result of establishment of the handover reservation of the path 73 from the ground control device 40, the ground control device 30 transmits the signal indicating the departure inhibition cancellation propriety to the train 10 as described in S111 of FIG. 2. When the ground control device 30 receives the result of the handover reservation establishment, the ground control device 30 transmits, to the train 10, a departure permission signal indicating cancellation of the departure inhibition for the station 60. Here, the signal indicating the departure inhibition cancellation propriety is to be the departure permission signal. The train 10 receives the departure permission signal for the station 60 from the ground control device 30, and can depart from the station 60.

Figure 4:
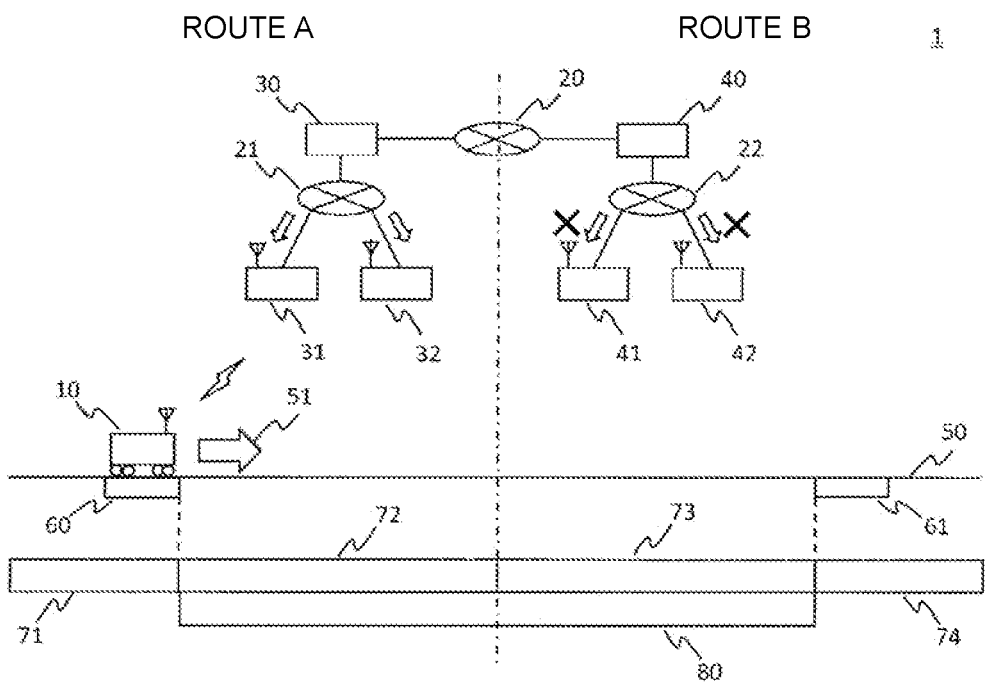
FIG. 4 is a diagram illustrating another example of the handover reservation of the train control system 1 according to the embodiment.

Next, a case where the handover reservation of the shared path 80 is not established will be described. FIG. 4 is a conceptual diagram illustrating that handover reservation of the shared path 80 is not established. When the ground control device 30 receives the request for entry into the shared path 80 from the train 10, the ground control device 30 establishes handover reservation of all the wireless base stations disposed on the route A in the shared path 80, specifically, the wireless base station 31 and the wireless base station 32. In other words, the ground control device 30 establishes handover reservation of all the wireless base stations disposed on the path 72 of the first railway operator in the shared path 80. Next, the ground control device 30 requests the ground control device 40 for handover reservation of all the wireless base stations disposed on the route B in the shared path 80, specifically, the wireless base station 41 and the wireless base station 42. In other words, the ground control device 30 requests handover reservation of all the wireless base stations disposed on the path 73 of the second railway operator, which is an entry destination of the train 10 in the shared path 80. The ground control device 40 determines whether it is possible to allocate a wireless resource of the wireless base station 41 and the wireless base station 42 disposed on the path 73. When the wireless resource of the wireless base station 41 and the wireless base station 42 disposed on the path 73 cannot be secured, the ground control device 40 cannot perform the handover reservation of the wireless base station 41 and the wireless base station 42. The ground control device 40 transmits, to the ground control device 30, a handover reservation result indicating that the handover reservation is not established, as a response to the handover reservation request. As described in S110 of FIG. 2, when the ground control device 30 receives, from the ground control device 40, the handover reservation result indicating the result that the handover reservation of the path 73 is not established, the ground control device 30 transmits, to the train 10, the signal indicating the departure inhibition cancellation propriety, as illustrated in S111 of FIG. 2. When the ground control device 30 receives the reservation result indicating that the handover reservation is not established, the ground control device 30 transmits, to the train 10, the departure inhibition signal indicating that the departure inhibition for the station 60 is continued. Here, the signal indicating the departure inhibition cancellation propriety is to be the departure inhibition signal. The train 10 receives the departure inhibition signal for the station 60 from the ground control device 30, and continues to stand at the station 60.

Here, as an example in which the handover reservation is not established, a case has been described in which the handover reservation of the wireless base station 41 and the wireless base station 42 of the path 73 is not established, but other cases may be adopted. For example, a case may be adopted in which the handover reservation is not established in any one of the wireless base stations on the path 72 or the path 73. In addition, as a cause of not establishing the handover, a case has been described in which the wireless resource of the wireless base station 41 and the wireless base station 42 cannot be secured, but other cases may be adopted. For example, a case may be adopted in which the ground control device 30 and the ground control device 40 cannot communicate due to a system failure or the like.

Figure 5:
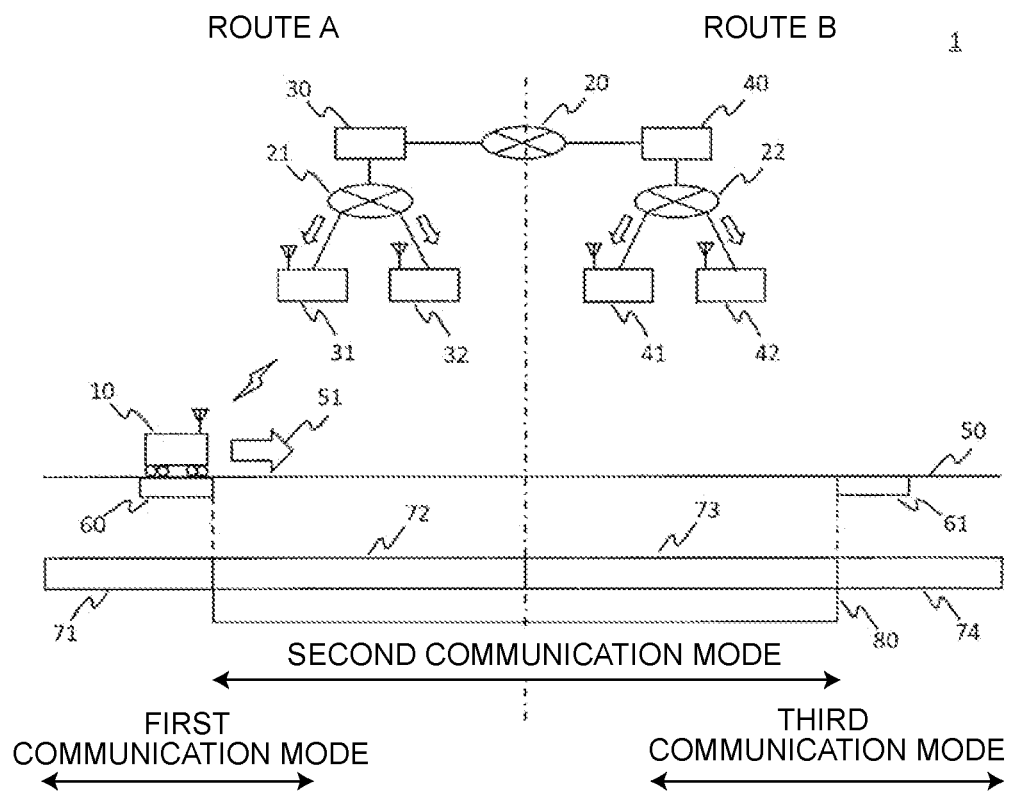
FIG. 5 is a conceptual diagram illustrating control of a train by the train control system 1 according to the embodiment.

Next, control of the train 10 permitted to enter the shared path 80 will be described. FIG. 5 is a conceptual diagram illustrating control of the train 10 permitted to enter the shared path 80. The train 10 is controlled with a communication specification for traveling on a route of the first railway operator until the train 10 stops at the station 60, that is, while the train 10 is present on the path 71. Specifically, the communication between the on-board control device of the train 10 and the ground control device 30 is performed in a first communication mode which is a communication specification of the first railway operator, and the train 10 is controlled.

The train 10 having received the departure permission signal for the station 60 from the ground control device 30 departs from the station 60 and enters the path 72. At the time of entering the path 72, the on-board control device of the train 10 switches the communication mode between with the ground control device 30 from the first communication mode to a degeneration mode which is a second communication mode. Here, in the degeneration mode, when the ground control device 30 and the train 10 perform communication, information limited to information necessary for controlling the train 10 is transmitted and received. Examples of the information necessary for controlling the train 10 include train location information and stop limit information. The on-board control device of the train 10 switches the communication mode between with the ground control device 30 to the degeneration mode, and the train 10 travels on the path 72 and enters the path 73. When the train 10 enters the path 73, the on-board control device of the train 10 communicates with the ground control device 40 in the degeneration mode. The on-board control device of the train 10 switches the communication mode between with the ground control device 40 from the degeneration mode, which is the second communication mode, to a third communication mode, while traveling on the path 73 or standing at the station 61. The third communication mode is a communication specification for traveling on a route of the second railway operator. When the train 10 travels after the path 74, communication with the ground control device 40 is performed in the third communication mode.

As described above, the train 10 travels in the degeneration mode on the shared path 80. The degeneration mode is a communication mode in which communication with the ground control device 30 and the ground control device 40 is possible. Here, a reason for travelling in the degeneration mode in the shared path 80 will be described. There is a case where communication specifications of the first railway operator and the second railway operator are different. Examples in which the communication specifications are different includes a case where the communication specification of the first railway operator is a specification in which large-capacity communication is possible, while the communication specification of the second railway operator is a specification in which large-capacity communication is not possible, and a case where communication formats of the first railway operator and the second railway operator are different. When the train 10 enters the path 73 in the first communication mode that is the communication specification of the first railway operator, the train 10 cannot communicate with the ground control device 40 of the second railway operator that does not support the first communication mode. When the train 10 cannot communicate with the ground control device 40, the train stops in consideration of safety. Even if reservation of the wireless base station disposed on the path 73 is secured, when communication cannot be performed, the train 10 stops. That is, the train 10 stops between the station 60 and the station 61. In order to avoid such a situation, the train 10 switches to the degeneration mode in which communication with the ground control device 30 and the ground control device 40 is possible, to communicate with the ground control device 30 and the ground control device 40. By performing communication in the degeneration mode, the train 10 can smoothly perform handover when entering the path 73 from the path 73, and the train 10 can be reliably controlled.

Figure 6:
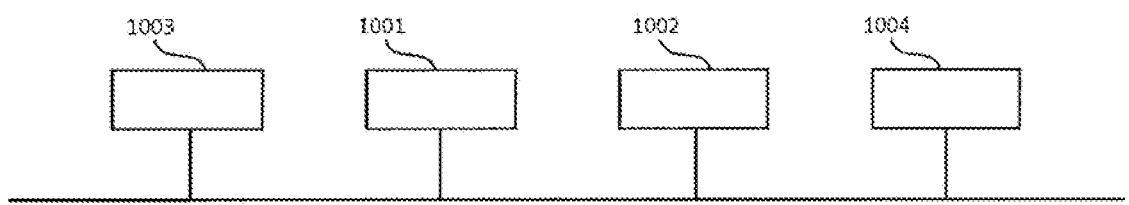
FIG. 6 is a diagram illustrating a general configuration example of hardware for implementing the train control system 1 according to the embodiment.

The ground control device 30 and the ground control device 40 include at least a processor, a memory, a receiver, and a transmitter, and an operation of each device can be implemented by software. FIG. 6 is a diagram illustrating a general configuration example of hardware that implements the ground control device 30 and the ground control device 40 of the train control system 1 according to the embodiment. The device illustrated in FIG. 6 includes a processor 1001, a memory 1002, a receiver 1003, and a transmitter 1004, and the processor 1001 performs computation and control by software by using received data. The memory 1002 stores received data or data necessary for the processor 1001 to perform computation and control, and also stores software. The receiver 1003 is an interface that receives signals or information input to the ground control device 30 and the ground control device 40. The transmitter 1004 is an interface that transmits signals or information output from the ground control device 30 and the ground control device 40. Note that a plurality of processors 1001, a plurality of memories 1002, a plurality of receivers 1003, and a plurality of transmitters 1004 may be provided.

In a train control system for a train that travels on a route including a first route managed by a first railway operator and a second route that is adjacent to the first route and is managed by a second railway operator, a train control system according to the embodiment includes a first ground control device installed on the first route; a first wireless base station installed on the first route and connected to the first ground control device; a second ground control device installed on the second route; and a second wireless base station installed on the second route and connected to the second ground control device, in which the first ground control device and the second ground control device can communicate with each other, the first ground control device performs handover reservation between with all the first wireless base stations disposed between a first station at which the train stops, the first station being installed on the first route, and a second station at which the train stops, the second station being installed on the second route and adjacent to the first station, and the first ground control device further transmits, to the second ground control device, a handover reservation request between with all the second wireless base stations disposed between the first station and the second station, and the second ground control device transmits, to the first ground control device, a result of the handover reservation request between with all the second wireless base stations disposed between the first station and the second station. As a result, when the train enters a route of the second railway operator from a route of the first railway operator, it is possible to reliably perform handover and smoothly enter the route of the second railway operator.

In the train control system according to the embodiment, the first ground control device can prevent the train from stopping between a route of the first railway operator and a route of the second railway operator, by transmitting, to the train, a departure inhibition signal indicating that departure from the first station is inhibited.

In the train control system according to the embodiment, when handover reservation between with all the second wireless base stations is established in response to the handover reservation request from the first ground control device, the second ground control device transmits, to the first ground control device, a handover reservation result indicating that the handover reservation is established. As a result, when the train enters a route of the second railway operator from a route of the first railway operator, it is possible to reliably perform handover and smoothly enter the route of the second railway operator.

In the train control system according to the embodiment, when the first ground control device receives, from the second ground control device, a handover reservation result indicating that the handover reservation is established, the first ground control device transmits a departure permission signal indicating cancellation of the departure inhibition to the train. As a result, when the train enters a route of the second railway operator from a route of the first railway operator, it is possible to reliably perform handover and smoothly enter the route of the second railway operator.

In the train control system according to the embodiment, when departing from the first station or after departing from the first station, the train switches a communication mode between with the first ground control device from a first communication mods, which is a normal communication mode when the train travels on the first route, to a second communication mode, which is a communication mode including only information necessary for controlling the train in the first ground control device and the second ground control device. As a result, when the train enters a route of the second railway operator from a route of the first railway operator, it is possible to reliably perform handover and smoothly enter the route of the second railway operator.

In the train control system according to the embodiment, the train switches a communication mode between with the second ground control device from the second communication mode to a third communication mode which is a normal communication mode when the train travels on the second route. As a result, it is possible to travel in a communication mode corresponding to a route of the second railway operator.

In the train control system according to the embodiment, when handover reservation between with all the second wireless base stations is not established in response to the handover reservation request from the first ground control device, the second ground control device transmits, to the first ground control device, a handover reservation result indicating that the handover reservation is not established.

As a result, it is possible to prevent the train from stopping between a route of the first railway operator and a route of the second railway operator.

In the train control system according to the embodiment, when the first ground control device receives the handover reservation result from the second ground control device, the first ground control device continuously transmits a departure inhibition signal to the train. As a result, it is possible to prevent the train from stopping between a route of the first railway operator and a route of the second railway operator.

REFERENCE SIGNS LIST 1 train control system; 10 train; 20, 21, 22 ground network; 30, 40 ground control device; 31, 32, 41, 42 wireless base station; 50 track; 51 arrow; 60, 61 station; 71, 72, 73, 74 path; 80 shared path; 1001 processor; 1002 memory; 1003 receiver; 1004 transmitter.

The invention claimed is:

1. A train control system for a train that travels on a route including a first route managed by a first railway operator and a second route that is adjacent to the first route and is managed by a second railway operator, the train control system comprising:
 a first ground controller installed on the first route;
 a first wireless base station installed on the first route and connected to the first ground controller;
 a second ground controller installed on the second route; and
 a second wireless base station installed on the second route and connected to the second ground controller, wherein
 the first ground controller and the second ground controller can communicate with each other,
 the first ground controller performs handover reservation between with all the first wireless base stations disposed between a first station at which the train stops, the first station being installed on the first route, and a second station at which the train stops, the second station being installed on the second route and adjacent to the first station, and the first ground controller further creates the list of handover destinations including all the second wireless base stations disposed between the first station and the second station, and transmits, to the second ground controller, a handover reservation request between with all the second wireless base stations, and
 the second ground controller transmits, to the first ground controller, a result of the handover reservation request between with all the second wireless base stations disposed between the first station and the second station.

2. The train control system according to claim 1, wherein the first ground controller transmits, to the train, a departure inhibition signal indicating inhibition of departure from the first station.

3. The train control system according to claim 2, wherein when the handover reservation between with all the second wireless base stations is established in response to a handover reservation request from the first ground controller, the second ground controller transmits, to the first ground controller, a handover reservation result indicating that handover reservation is established.

4. The train control system according to claim 3, wherein when the first ground controller receives, from the second ground controller, the handover reservation result indicating that handover reservation is established, the first ground controller transmits, to the train, a departure permission signal indicating cancellation of departure inhibition.

5. The train control system according to claim 4, wherein when departing from the first station or after departing from the first station, the train switches a communication mode between with the first ground controller from a first communication mode to a second communication mode, the first communication mode being a normal communication mode when the train travels on the first route, and the second communication mode being a communication mode including only information necessary for controlling the train in the first ground controller and the second ground controller.

6. The train control system according to claim 5, wherein the train switches a communication mode between with the second ground controller from the second communication mode to a third communication mode, the third communication mode being a normal communication mode when the train travels on the second route.

7. The train control system according to claim 2, wherein when the handover reservation between with all the second wireless base stations is not established in response to a handover reservation request from the first ground controller, the second ground controller transmits, to the first ground controller, a handover reservation result indicating that handover reservation is not established.

8. The train control system according to claim 7, wherein the first ground controller continuously transmits the departure inhibition signal to the train when the first ground controller receives the handover reservation result from the second ground controller.

* * * * *